United States Patent
Almgren et al.

(10) Patent No.: US 8,112,638 B2
(45) Date of Patent: Feb. 7, 2012

(54) SECURE BACKUP SYSTEM AND METHOD IN A MOBILE TELECOMMUNICATION NETWORK

(76) Inventors: Fredrik Almgren, Stockholm (SE); Mariette Lehto, Stockholm (SE)

( * ) Notice: Subject to any disclaimer, the term of this patent is extended or adjusted under 35 U.S.C. 154(b) by 633 days.

(21) Appl. No.: 11/913,857

(22) PCT Filed: May 9, 2006

(86) PCT No.: PCT/SE2006/000551
§ 371 (c)(1),
(2), (4) Date: Jun. 23, 2008

(87) PCT Pub. No.: WO2006/121393
PCT Pub. Date: Nov. 16, 2006

(65) Prior Publication Data
US 2009/0228719 A1    Sep. 10, 2009

(30) Foreign Application Priority Data
May 10, 2005 (SE) ........................ 0501074

(51) Int. Cl.
*H04L 29/06* (2006.01)
(52) U.S. Cl. .................... 713/193; 380/286
(58) Field of Classification Search .................... 713/193; 380/286; 707/640–654, 661, 665, 667, 670–673
See application file for complete search history.

(56) References Cited

U.S. PATENT DOCUMENTS

| | | | | |
|---|---|---|---|---|
| 7,054,268 | B1 * | 5/2006 | Parantainen et al. | 370/231 |
| 7,099,479 | B1 * | 8/2006 | Ishibashi et al. | 380/281 |
| 2003/0026432 | A1 * | 2/2003 | Woodward | 380/278 |
| 2004/0010467 | A1 * | 1/2004 | Hori et al. | 705/50 |
| 2004/0171399 | A1 * | 9/2004 | Uchida et al. | 455/514 |
| 2006/0030294 | A1 * | 2/2006 | Funnell et al. | 455/410 |
| 2006/0089123 | A1 * | 4/2006 | Frank | 455/411 |

FOREIGN PATENT DOCUMENTS
EP    1387523    2/2004
* cited by examiner

Primary Examiner — Taghi Arani
Assistant Examiner — Justin T Darrow
(74) Attorney, Agent, or Firm — Fasth Law Offices; Rolf Fasth

(57) ABSTRACT

The secure backup system is in a mobile telecommunication network and has at least one mobile station with data, a backup entity for storing a backup file of the data, and cryptographic means for encrypting and decrypting the data. The cryptographic means contains a decryption key consisting of at least a first key part, a second key part and a key recreation key part. The key parts are stored in different entities.

19 Claims, 3 Drawing Sheets

SECURE BACKUP SYSTEM AND METHOD IN A MOBILE TELECOMMUNICATION NETWORK

PRIOR APPLICATIONS

Figure 1:
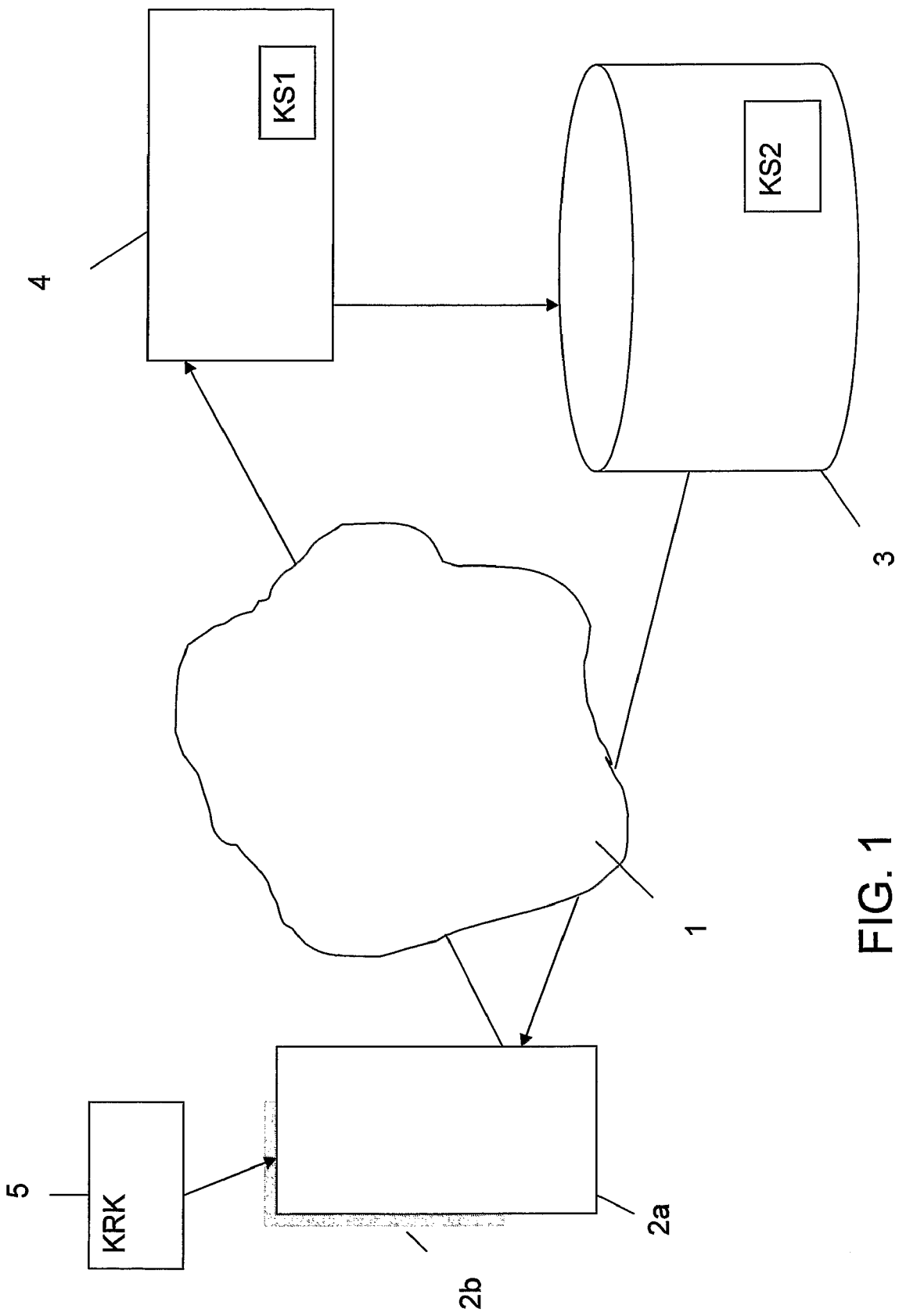

This is a US national phase patent application that claims priority from PCT/SE2006/000551 filed 9 May 2006, that claims priority from Swedish Patent Application No. 0501074-9, filed 10 May 2005.

TECHNICAL FIELD

The invention is concerned with a secure backup system and method in a mobile telecommunication network including backup solutions to either or both of the SIM card of a mobile phone and the mobile phone itself.

BACKGROUND ART

The Global System for Mobile Communication (GSM) is a standard for digital wireless communications with services, such as voice telephony. GSM, together with other technologies, is part of an evolution including e.g. General Packet Radio Service (GPRS), and Universal Mobile Telecommunications Service (UMTS). UMTS is the next ($3^{rd}$) generation mobile communication system, which provides an enhanced range of multimedia services, such as video.

The Subscriber Identity Module (SIM) is a smart card that saves subscriber information about identity, subscription, subscription environment, radio environment and other information. The information in the SIM is stored in a logical structure of files.

UMTS has specified the use of the USIM (UMTS Subscriber Identity Module) as the evolution of SIM. In GSM and UMTS networks, the (U)SIM card is central both for subscriber identification and for providing value added services to users. The SIM card is the user subscription to the GSM mobile network and the USIM card is the user subscription to the UMTS mobile network. Sometimes the word "SIM" is meant to cover "USIM" as well.

The development of GSM Networks and terminals to support more advanced data bearer technologies has allowed for the introduction of new exciting data services, such as communications, financial management, information retrieval, entertainment and game playing. Therefore, the U(SIM) cards might have a lot of subscriber specific information stored.

The Mobile Station (MS), also referred to as the "device", represents the only equipment the GSM user ever sees from the whole system. It actually consists of two distinct entities. The actual hardware is the Mobile Equipment (ME), also referred to as the "terminal" or the "handset", which consists of the physical equipment, such as the radio transceiver, display and digital signal processors. The subscriber information is stored in the Subscriber Identity Module (SIM), implemented as a Smart Card.

When a new (U)SIM is issued, a lot of information, both personal and to some extent operator defined, is lost, unless this information is copied from the old (U)SIM to the new (U)SIM. This could for example be the phone book. Introducing a new terminal has other problems—since it is not personalized as (U)SIM cards are. Hence it is required to be configured with network settings to be enabled to use the different services the Mobile Service Provider offers. Apart from that, the same problem with personal information and services, as with the (U)SIM Cards, applies.

Some problems arise when an end user wants to change either subscription or terminal or both as data stored in the old terminal and/or old (U)SIM card can get lost.

A problem arises when the subscriber considers the data stored on his device as sensitive. Therefore, the subscriber does not feel comfortable with transmitting the data or to allow the data to be stored in some storage for retrieval.

This problem requires the data to be encrypted for transfer and storage.

Most encryption algorithms are key-based. In them, a 'key' or 'password' of some kind is specified, and the encryption algorithm works in such a way that each 'key' or 'password' produces a different encrypted output, which requires a unique 'key' or 'password' to decrypt. There are symmetrical and asymmetrical encryption methods, in which the keys used either consists of a 'symmetrical' key (in the symmetric method) where both encryption and decryption use the same key or 'asymmetrical' ones (in the asymmetric method) where encryption and decryption keys are different.

The popular 'PGP' public key encryption method, and the 'RSA' encryption that it is based on, uses 'asymmetrical' keys. The encryption key, also called the 'public key', is significantly different from the decryption key, which is called the 'private key', such that attempting to derive the private key from the public key involves so many hours of computing time, that it usually is considered unfeasible to derive it. The principle of such infrastructures can be that everyone in the communication system has their own public key, that is known to everyone in the system and which is used to encrypt messages, and a private key, that is only known to the user, for decrypting messages that are encrypted with the user's public key.

When using the term secret key in the following, that refers to either the private key in an asymmetric cryptosystem or the shared key in a symmetric cryptosystem.

A secret key consists, in essence, of a sequence of numbers each of which has a value from 0 to 255 (such numbers are called bytes) and is often called a secret key. The required length of a secret key is determined by the algorithm which is used for the encryption and the level of security desired. The required length of a key for algorithms used can vary e.g. from 16 bytes (IDEA algorithm) to 255 bytes (RC-6 algorithm).

Secret keys of sufficient length to produce acceptable levels of protection for the encrypted data are almost impossible to memorize. Therefore, secret keys are usually stored on floppy disks or other removable media, and these media in turn are stored in safe places with restricted access.

It is a common practice in everyday life not to deal directly with the secret keys, but generate them when they are needed for encryption or decryption from passwords or to protect the keys with a password. But here, the tradeoff is in terms of security: in order to perform secure encryption with a password, it must include a great variety of different symbols and it must be as long as possible.

The subscriber must be able to ensure that the secret key is only accessible for him. When the data later is to be restored on the mobile station either a new one (SIM card or terminal changed) or the same one, it must be possible to decrypt the data.

If the secret keys needed for the decryption are stored on the terminal or on the SIM specifically, and the user loses his mobile station, the keys will be lost as well.

One solution would be to for the user to make a copy of his secret key and keep it on a floppy disk or on a thumb drive that is kept in a safe place. However, that solution involves the risk for not being used in which case the secret key is permanently lost and thus the data is lost as well.

THE OBJECT OF THE INVENTION

This invention relates to the problem of making a remote backup of the content stored on a mobile device in a manner that protects the user from having a third party being able to access the data.

A more specific object is to develop a secure remote backup solution which allows for data retrieval even though the decryption key is lost.

SUMMARY OF THE INVENTION

The secure backup system of the invention is in a mobile telecommunication network and comprises at least one mobile station with data, a backup entity for storing a backup file of said data, and cryptographic means for encryption and decryption of said data. The cryptographic means contains a decryption key consisting of at least a first key part, a second key part and a key recreation key part, whereby the key parts are stored in different entities also comprised by the system.

Preferably, the system comprises a separate entity for each decryption key part.

The entity for storing one part of said decryption key can be the backup entity, called Backup Manager in this text, also storing the encrypted data to be retrieved (i.e. the backup file).

In the steps of the secure backup method of the invention, an encrypted backup file of data is created in a first mobile station.

When the mobile communication network is GSM or UMTS, the encryption key needed for the encryption is retrieved from the (U)SIM or, alternatively, the encryption is executed on the (U)SIM. When the backup file has been encrypted, the encrypted backup file is sent to an entity to be stored for later downloading to a second mobile station or the same mobile station, preferably to the (U)SIM, wherein decryption is performed and where the whole decryption key is present on the (U)SIM card of the mobile station, when said key parts have been retrieved thereto.

That backup file is then stored in said backup entity. In the case where the backup is to be restored on the same mobile station as it was generated on, the procedure is straightforward since the decryption means are available. However, when the encrypted backup file is downloaded to a second mobile station, the situation is more complex. The encrypted backup file is downloaded to the second mobile station at an optional moment. The second mobile station can consist of a new SIM card compared to the first mobile station but the terminal can be the same or a new one or the same SIM card with a new terminal.

In the case where the original SIM can not be used in the second mobile station, the decryption key needs to be recreated in order to decrypt the encrypted backup file. In the process of recreating the decryption key a first part of said decryption key is retrieved by the second mobile station from an entity storing a first part of said decryption key. A second part of the decryption key is retrieved by the second mobile station from an entity storing a second part of said decryption key. Also a key recreation key has to be entered to the second mobile station. The retrieved parts of the decryption key are then combined in the second mobile station by means of said key recreation key in order to form the decryption key to be used for decryption of the backup file. Thereafter the decrypted backup file can be restored to the second mobile station.

The key recreation key can be stored in an external entity or even memorized by the user before being entered to the mobile station.

The encrypted backup file can also be sent directly to a second mobile station in some cases and the decryption key can consists of more than two parts.

The solution of the invention introduces a Key Manager into the network as an entity storing a part of the decryption key. It is assumed that all entities in the network might distrust each other. Therefore some conditions for communication should be fulfilled.

The backup data, which is the data to be transferred from one mobile station to another one via a temporary storage in e.g. the Backup Manager should always be sent encrypted over the network and encryption/decryption should always be performed only on the user terminal.

Furthermore, the Backup Manager should not be able to get the decryption key segment stored on the Key Manager and the Key Manager should not be able to get the encrypted backup from the Backup Manager. Furthermore, as the user does not trust the Key Manager, the Key Manager must thus not be able to access the decryption key segment stored on the Backup Manager or the recreation key on the user device.

The stored backup file will be downloaded when there is a need to restore data for whatever reason. The following scenarios can serve as examples of such reasons to restore the backup. One case is when the terminal is changed but the SIM card is kept, and another when the SIM card is changed. A further case in which use is made of the backup file is when the backup file is to be sent to another mobile station with another SIM and another terminal. It is also possible to restore the backup to the same terminal on which it was created.

The solution of the invention is of special use when the SIM card is changed as the end-user needs to retrieve the decryption key when changing SIM card. Recreation of the decryption key is preferably only to be possible to do on the user's mobile station, and more preferably only on the SIM (or some other module if the mobile station is not a GSM phone).

The solution is built on the fact that different entities, such as the Key Manager and the Backup Manager, share elements of the secret key and that it is possible to use a recreation key. The decryption key is thus jointly protected by e.g. the Backup Manager and the Key Manager by dividing some info between them. That means that neither one of them can decrypt the backup.

Thus, when the subscriber e.g. changes SIM card, the key for decryption of data to be transferred needs to be recreated. The Key Segments, $KS_1$ and $KS_2$, are retrieved from the Key Manager and the Backup Manager. The Key Segment from the Backup Manager can be retrieved separately or together with the actual backup.

This means that $KS_1$ and $KS_2$ are downloaded onto the mobile station where they are combined. In order to generate a correct and functional key, the subscriber has to enter a Key Recreation Key, KRK. The KRK has to be either memorized by the subscriber or stored on some external system. The handling of the storage of KRK is not in scope of this invention.

Thus by applying a suitable formula "f" onto KS1, KS2 and KRK, the decryption key can be recreated according to this structure Key=$f(KS_1, KS_2, KRK)$.

For each of the entities, e.g. the Key Manager and Backup Manager, the subscriber access to data may be protected by passwords/PINS.

In the following, the invention is described by means of some preferable embodiments by means of figures. The intention is not to restrict the invention to the details of the following description, which presents some examples for illustrative purposes.

FIGURES

Figure 2:
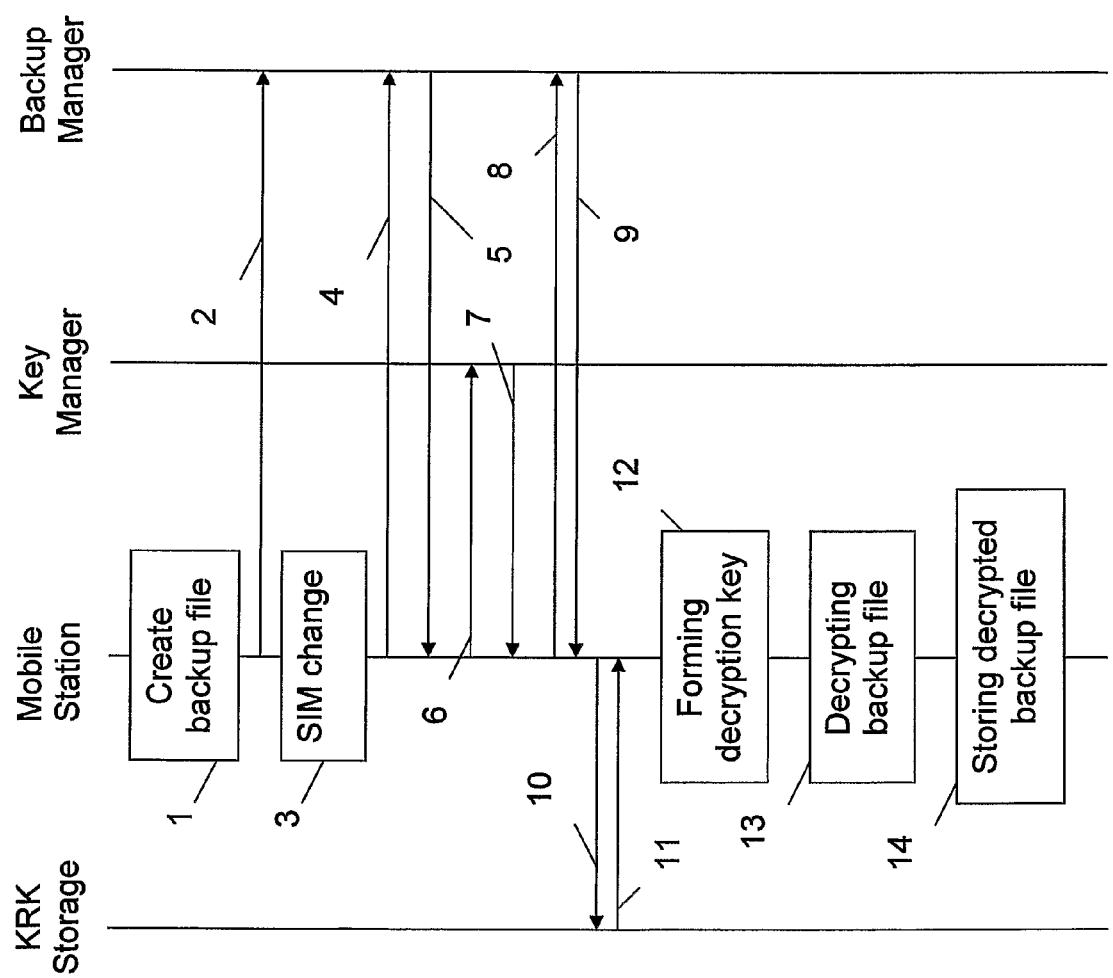
Figure 3:
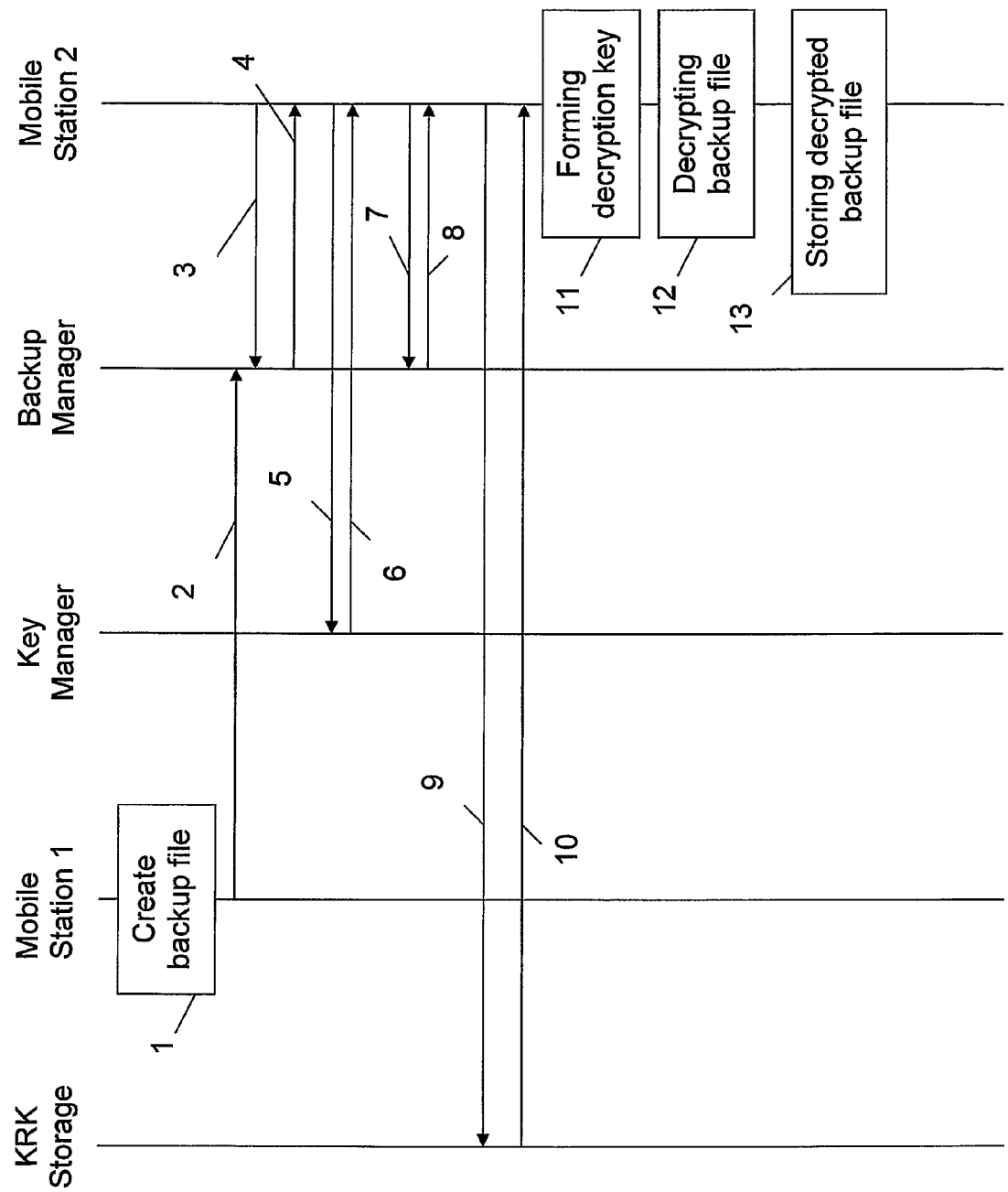

FIG. 1 is an example of an environmental view of a network in which the invention can be implemented FIG. 2 is a signal diagram of an embodiment of the invention, wherein data is transferred from an old SIM card to a new SIM card in a mobile station FIG. 3 is a signal diagram of an embodiment of the invention, wherein data is transferred from one mobile station to another

DETAILED DESCRIPTION

The network of FIG. 1 consists of three major users. The network provider provides some communication network, which in FIG. 1 has the reference number 1. The Subscribers subscribe to services from this network and have devices 2a and 2b respectively, suited to communicate over the network 1. A Backup Manager 3 provides a service for storing of data from the subscriber device 2a or 2b for later restore purposes in the form of a backup file.

Encryption can be used for all backups sent over the network 1 from the mobile stations 2a, 2b. Means for encryption of data to be transferred in the form of encryption keys are stored in those mobile stations 2a, 2b in the network from which encrypted messages are sent. A decryption key has to be used for decryption. Decryption keys are stored in the mobile stations as well. The decryption key is also stored in parts in other entities connected to the network. The decryption key consists of at least a first part, a second part and a recreation part.

The system of the invention further comprises separate entities for storing of said key parts. For that purpose, the solution of the invention introduces a Key Manager 4. The solution of the invention is built on an assumption that all entities in FIG. 1 distrust one another. This means that the user does not trust the Backup Manager 3 and that the Backup Manager 3 does not trust the Key Manager 4, which does not trust the Backup Manager 3 and no one trusts the network 1.

The entity for storing one part of said decryption key can be the Backup Manager 3 also storing the encrypted data to be transferred (i.e. the back up file) and the entity for storing another part of the decryption key can be the Key Manager 4.

There are situations, wherein the decryption key is missing in the SIM card of a mobile station but backup data downloaded from the Backup Manager 3 to a mobile station needs to be decrypted. Such a situation might be when for example a user changes his SIM card to a new SIM card with no decryption key that is possible to use for decryption of the stored backup and for some reason has no ability to reproduce the decryption key onto the new card or when a decryption key e.g. has been deleted from a SIM card by a mistake or of other reasons. Also if a backup file is transferred from one mobile station to another with no decryption key via the Backup Manager 3, a decryption key is needed in the second mobile station. Normally, that decryption key would be provided in the second mobile by inserting the first SIM into the second terminal. If the first SIM is not available, the decryption key needs to be recreated.

Thus, when the subscriber changes SIM card, the key for decryption of the backup data, that is stored at the Backup Manager 3 and that is to be restored, needs to be recreated and the parts of the decryption key, called here Key Segments, $KS_1$ and $KS_2$, are retrieved from the Key Manager 4 and the Backup Manager 3.

This means that $KS_1$ and $KS_2$ are downloaded onto the mobile station where they are combined. In order to generate a correct and functional key, the subscriber has to enter a Key Recreation Key, KRK. The KRK has to be either memorized by the subscriber or stored on some external system 5.

FIG. 2 is a signal diagram of an embodiment of the invention assumed to be in a situation wherein the SIM card of the user's mobile station is changed. In the diagram, the "mobile station" stands for both the first mobile station and the second mobile station with a new SIM card.

For this purpose, a backup file is created of data in the original SIM card of the mobile station in step 1. An encryption key is needed to encrypt this backup file. The encryption key used in this step is stored in the original SIM. The backup data is encrypted in step 1 using this encryption key and is then sent in the encrypted form to the Backup Manager in step 2.

At any time after step 2, the user changes the SIM card in the mobile station, which is performed in step 3.

After inserting of the new SIM in the mobile station, the backup data file stored at the backup provider needs to be downloaded to the mobile station and a request for the backup file is sent in step 4, the downloading being performed in step 5 of FIG. 1.

Now the downloaded backup file should be decrypted. The decryption key for the decryption was contained in the original SIM card. However, the necessary decryption key is not present on the new SIM.

When the data needs to be decrypted in the mobile station with the new SIM, the decryption key therefore has to be retrieved in some way. The key necessary to decrypt the backup data file consists of two parts, the first one being stored in an external entity called Key Manager and the second one being stored in the Backup Manager being the entity storing backup files for later downloading.

To create the necessary decryption key, the first part of the decryption key is downloaded to the mobile station from the Key Manager by requesting the key in signal 6 and receiving it with signal 7.

The second part of the decryption key is downloaded to the mobile station from the Backup Manager storing the second part of said decryption key with signals 8 and 9. A key recreation key is then entered to the mobile station either by the user or by downloading it from an external recreation key storage, KRK storage with signals 10 and 11.

The retrieved parts of the encryption key are then combined in the mobile station by means of said key recreation key in order to form the decryption key in step 12 to be used for the decryption. The created backup file is then decrypted in step 13 by means of said decryption key.

Thereafter, the decrypted backup file can be restored, which in FIG. 2 is done in step 14.

FIG. 3 is a signal diagram of an embodiment of the invention assumed to be in a situation wherein data in a mobile station is transferred to a second mobile station with a new SIM and a new terminal compared to the first mobile station.

As in the embodiment of FIG. 2, a backup file of data is created in the SIM card of the first mobile station in step 1. An encryption key is needed to encrypt this backup file. The encryption key used in this step is stored in the SIM of the first mobile station. The backup data is encrypted in step 1 using this encryption key and is then sent in the encrypted form to the Backup Manager in step 2.

The backup data file stored at the Backup Manager now needs to be downloaded to the other mobile station and a request for the backup file is sent in step 3, the downloading being performed in step 4 of FIG. 3.

Now the downloaded backup file should be decrypted. The decryption key for the decryption was contained in the SIM card of the first mobile station. However, the necessary decryption key is not present on the second mobile station to which the backup file has been downloaded.

As in FIG. 2, the decryption key therefore has to be retrieved in some way. The key necessary to decrypt the backup data file consists of two parts, the first one being stored in an external entity called Key Manager and the second one being stored in the Backup Manager being the entity storing backup files for later downloading.

To create the necessary decryption key, the first part of the decryption key is downloaded to the second mobile station from the Key Manager by requesting the key in signal 5 and receiving it with signal 6.

The second part of the decryption key is downloaded to the mobile station from the Backup Manager storing the second part of said decryption key with signals 7 and 8.

A key recreation key is then entered to the mobile station either by the user or by downloading it from an external recreation key storage, KRK storage with signals 9 and 10.

The retrieved parts of the encryption key are then combined in the mobile station by means of said key recreation key in order to form the decryption key in step 11 to be used for the decryption. The created backup file is then decrypted in step 12 by means of said decryption key.

Thereafter, the decrypted backup file can be restored, which in FIG. 3 is done in step 13.

While the present invention has been described in accordance with preferred compositions and embodiments, it is to be understood that certain substitutions and alterations may be made thereto without departing from the spirit and scope of the following claims.

The invention claimed is:

1. A secure backup system in a mobile telecommunication network, comprising:
   a first mobile station with data, the first mobile station having means for creating a backup file of the data in an encrypted form,
   the first mobile station having means for sending the encrypted backup file over the mobile communication network to a backup entity,
   the backup entity having means for receiving and storing the encrypted backup file,
   a decryption key containing at least a first key part, a second key part and a key recreation key part,
   a second mobile station having means for retrieving the encrypted backup file and for retrieving the first key part of the decryption key from a first entity and for retrieving the second key part of the decryption key from a second entity, the first entity being different from the second entity, the second mobile station having means for receiving the key recreation key and combining the first key part and the second key part and forming the decryption key, and
   the second mobile station having means for decrypting the backup file using the decryption key.

2. The secure backup system of claim 1 wherein the system comprises a separate entity for each key part.

3. The secure backup system of claim 1 wherein one of the key parts is stored in the backup entity.

4. The secure backup system of claim 1 wherein the mobile telecommunication network is GSM or UMTS.

5. The secure backup system of claim 1 wherein the first mobile station has a SIM or USIM card having cryptographic means for encrypting and decrypting data of the backup file.

6. The secure backup system of claim 1, wherein the cryptographic means further is adapted to recreate the decryption key by applying a formula on the first key part, the second key part and the key recreation key part.

7. A secure backup method in a mobile telecommunication network comprising:
   providing at least one mobile station with data, a back up entity for storing a backup file of the data, and
   cryptographic means for encrypting and decrypting the data, the cryptographic means having a decryption key containing at least a first key part, a second key part and a key recreation key part, and entities for storing the key parts,
   the method comprising:
   creating an encrypted backup file of data in a first mobile station,
   sending the encrypted backup file of data over the mobile telecommunication network to the backup entity,
   storing the encrypted backup file in the backup entity,
   downloading the encrypted backup file to a second mobile station,
   retrieving a first part of a decryption key to the second mobile station from a first entity storing a first part of said the decryption key,
   retrieving a second part of the decryption key to the second mobile station from a second entity storing a second part of the decryption key,
   entering a key recreation key to the second mobile station, combining the retrieved first and second parts of the decryption key in the second mobile station by means of said key recreation key in order to form the decryption key to be used for decryption, and
   decrypting the created backup file by using said decryption key.

8. The secure backup method of claim 7, wherein the method further comprises downloading the separate parts of the decryption key to a SIM card of the second mobile station.

9. The secure backup method of claim 7 wherein the method further comprises performing encryption and decryption in the SIM card.

10. The secure backup method of claim 7 wherein the method further comprises providing the second mobile station with a new SIM.

11. The secure backup method of claim 7 wherein the method further comprises storing the key recreation key in an external entity before entering a key recreation key to the second mobile station.

12. The secure backup method of claim 7, wherein in the step of combining the decryption key is recreated by applying a suitable formula on the first key part, the second key part and the key recreation key part.

13. A backup method in a mobile telecommunication network, comprising:
   providing a first and a second mobile station in communication with a backup entity having a backup file; a first entity containing a first key part; and a second entity containing a second key part,
   creating an encrypted backup file in the first mobile station, the first mobile station sending the encrypted backup file over the mobile telecommunication network to the backup entity,
   the backup entity storing the encrypted backup file,
   the second mobile station retrieving the encrypted backup file,
   the second mobile station retrieving the first key part from the first entity and the second key part from the second entity, the second mobile station using a key recreation key to combine the first key part with the second key part to form a decryption key, and the second mobile station using the decryption key to decrypt the encrypted backup file.

14. The method claim of 13, wherein the claim further comprises the step of the second mobile station obtaining the key recreation key from an external system.

15. A backup method in a mobile telecommunication network, comprising:

providing a mobile station having a first SIM card, the mobile station being in communication with a backup entity having a backup file; a first entity containing a first key part; and a second entity containing a second key part, creating an encrypted backup file in the mobile station, the mobile station sending the encrypted backup file over the mobile telecommunication network to the backup entity, the backup entity storing the encrypted backup file, replacing the first SIM card with a second SIM card in the mobile station, the mobile station retrieving the encrypted backup file, the mobile station retrieving the first key part from the first entity and the second key part from the second entity, the mobile station using a key recreation key to combine the first key part with the second key part to form a decryption key, and the mobile station using the decryption key to decrypt the encrypted backup file.

16. The method of claim 15 wherein the method further comprises the step of the mobile station retrieving the first key part from a key manager and the second key part from a backup manager.

17. The method of claim 15 wherein the method further comprises the step of the user entering the key recreation key into the mobile station.

18. The method of claim 15 wherein the method further comprises the step of storing the backup file in the first SIM card of the mobile station.

19. A backup method in a mobile telecommunication network, comprising:

providing a first mobile station having a backup file; a second mobile station; a first entity containing a first key part; and a second entity containing a second key part, the first mobile station using an encryption key to encrypt the backup file in the first mobile station, the first mobile station sending the encrypted backup file over the mobile telecommunication network to a backup entity, the backup entity storing the encrypted backup file, the second mobile station retrieving the encrypted backup file, the second mobile station retrieving the first key part from the first entity and the second key part from the second entity, the second mobile station using a key recreation key to combine the first key part with the second key part to form a decryption key, and the second mobile station using the decryption key to decrypt the encrypted backup file.

\* \* \* \* \*